US011912591B2

(12) United States Patent
Mcdonald et al.

(10) Patent No.: US 11,912,591 B2
(45) Date of Patent: Feb. 27, 2024

(54) ELECTRODIALYSIS PROCESSES USING AN ORGANIC SOLVENT FOR SEPARATING DISSOLVED SPECIES

(71) Applicant: MIS IP Holdings, LLC, Houston, TX (US)

(72) Inventors: Brian M. Mcdonald, Austin, TX (US); Ethan L. Demeter, The Woodlands, TX (US)

(*) Notice: Subject to any disclaimer, the term of this patent is extended or adjusted under 35 U.S.C. 154(b) by 280 days.

(21) Appl. No.: 17/189,853

(22) Filed: Mar. 2, 2021

(65) Prior Publication Data
US 2021/0276892 A1 Sep. 9, 2021

Related U.S. Application Data

(60) Provisional application No. 62/984,681, filed on Mar. 3, 2020.

(51) Int. Cl.
| | | |
|---|---|---|
| *C02F 1/469* | (2023.01) | |
| *B01D 61/46* | (2006.01) | |
| *B01D 61/52* | (2006.01) | |
| *C02F 101/10* | (2006.01) | |

(Continued)

(52) U.S. Cl.
CPC ............ *C02F 1/4691* (2013.01); *B01D 61/46* (2013.01); *B01D 61/52* (2013.01); *B01D 2311/25* (2013.01); *B01D 2311/2642* (2013.01); *B01D 2311/2669* (2013.01); *B01D 2311/2673* (2013.01); *C02F 2101/101* (2013.01);

(Continued)

(58) Field of Classification Search
CPC ............ B01D 61/422; B01D 61/24–32; B01D 21/2461; C02F 1/4693; H01M 8/227
See application file for complete search history.

(56) References Cited

U.S. PATENT DOCUMENTS 3,003,940 A * 10/1961 Mason ................... B01D 61/52
204/525
3,450,508 A * 6/1969 Cooper .................. B01D 71/06
423/6

(Continued)

OTHER PUBLICATIONS

Lopez et al., "Separation of organic acids from water using ionic liquid assisted electrodialysis", May 27, 2013, Separation and Purification Technology, vol. 116, p. 162-169. (Year: 2013).*

(Continued)

*Primary Examiner* — Luan V Van
*Assistant Examiner* — Andrew Koltonow
(74) *Attorney, Agent, or Firm* — MORRISON & FOERSTER LLP; Nathan Vogler

(57) ABSTRACT

Provided are water treatment systems and methods of treating water that include separating dissolved salts from a feed stream using an organic solvent brine stream. For example, described are water treatment systems comprising: an electrodialysis device comprising an inlet feed stream, an inlet brine stream, an outlet product stream, and an outlet brine stream; and a precipitation tank comprising an inlet stream and an outlet stream, wherein the inlet stream of the precipitation tank comprises the outlet brine stream of the electrodialysis device, and the inlet brine stream of the electrodialysis device comprises the outlet stream of the precipitation tank, and wherein inlet brine stream and outlet brine stream comprises an organic solvent.

16 Claims, 6 Drawing Sheets

(51) Int. Cl.
   *C02F 101/12*  (2006.01)
   *C02F 103/10*  (2006.01)

(52) U.S. Cl.
   CPC .... *C02F 2101/108* (2013.01); *C02F 2101/12* (2013.01); *C02F 2103/10* (2013.01)

(56) References Cited

U.S. PATENT DOCUMENTS

| | | | |
|---|---|---|---|
| 3,865,961 A * | 2/1975 | Wucherpfennig | C12H 3/04 426/15 |
| 4,548,614 A | 10/1985 | Ireland | |
| 2007/0084778 A1 * | 4/2007 | St.Germain | C02F 1/16 202/81 |
| 2014/0299529 A1 * | 10/2014 | Govind | C02F 1/4693 210/243 |
| 2014/0305149 A1 * | 10/2014 | Sparrow | B01D 5/003 159/43.1 |

OTHER PUBLICATIONS

Xu et al., "Electrodialysis with ion exchange membranes in organic media", Nov. 26, 2004, Separation and Purification Technology, 43, 17-24. (Year: 2004).*

Kameche et al., "Electrodialysis in water-ethanol solutions: Application to the acidification of organic salts", Sep. 16, 2003, Desalination, 154, 9-15. (Year: 2003).*

\* cited by examiner

ELECTRODIALYSIS PROCESSES USING AN ORGANIC SOLVENT FOR SEPARATING DISSOLVED SPECIES

REFERENCE TO RELATED APPLICATIONS

This application claims the benefit of U.S. Provisional Application No. 62/984,681, filed Mar. 3, 2020, the entire contents of which are incorporated herein by reference.

FIELD OF THE DISCLOSURE

This disclosure relates to electrochemical processes for separating charged chemical species using an organic solvent brine stream.

BACKGROUND OF THE DISCLOSURE

Electrochemical methods were developed to reduce the energy requirements of desalination processes by avoiding energy intensive phase changes. Generally, electrochemical methods include two electrodes having ion exchange membranes placed in between. The ion exchange membranes allow the passage of positively or negatively charged ions depending on the nature of the functional groups of the charged ions. Alternating these membrane types creates compartments that allow the removal of ions from one stream and the addition of ions to an adjacent stream when an electric field is applied between the electrodes that encapsulate the membranes.

The electrochemical desalination method provides an energy efficient desalination process. To increase the process capacity of this method, pairs of ion exchange membranes are stacked on top of each other to form stacks. These stacks can range from 1 pair to over 1000 pairs.

Electrochemical desalination methods and even physical separation methods such as reverse osmosis produce a concentrated brine. Disposal of brines can be difficult due effects on salinity of surface water, ground water, and aquatic life. Brine producers are interested in developing zero liquid discharge or minimum liquid discharge to reduce the environmental impact of their concentrated brines and to recover more water from their processes.

In many cases, the brine contains desirable chemicals from compounds of boron, bromine, calcium, iodine, lithium, magnesium, potassium and sodium. These compounds are traditionally recovered using evaporation technologies such as evaporation ponds or thermal crystallizers. The former requires large land (0.5 acres/gpm evaporation) and the latter requires large energy (>140 kW*hr/m3).

Conventional electrochemical methods are not used to precipitate chemicals from solutions due to the potential for forming scale in the electrochemical cells. Chemical species present in aqueous brines have a range of solubilities, which can limit the ability to concentrate other species present in the brine. Another limitation in electrochemical technologies results from the practical limits on concentration using the state-of-the-art ion exchange membranes. As gradients in the electrochemical cell increase, the rate of diffusion in the reverse and forward directions become similar. This results in no further concentrating capability. In order to achieve minimum liquid discharge or recover the chemical in the brine, the brines must be sent through thermal evaporation technologies such as mechanical vapor recompression, multi-effect distillation, or multi-effect flash distillation prior to crystallization in thermal crystallizers or evaporation ponds.

SUMMARY OF THE DISCLOSURE

Provided are electrochemical processes for separating charged chemical species from an aqueous feed stream using an organic solvent as a brine stream. Processes provided herein are capable of achieving a super saturated solution while requiring a relatively low amount of energy. Further, by using organic solvent in the brine stream, which has a relatively low solubility compared to an aqueous brine stream, a positive chemical gradient is produced between the aqueous feed stream and the organic solvent brine stream. A positive chemical gradient reduces the resistance of charged ions from moving to the organic brine stream form the aqueous feed stream. Dissolved salts in the resulting brine stream may be precipitated out of solution and the supernatant of the brine stream may be collected and returned to the electrochemical process for further concentration.

In some embodiments, the pH of the feed stream may be controlled to further enable charged ion separation. For example, a common dissolved salt, boron, generally exists in aqueous solutions as boric acid ($H_3BO_3$). Boric acid can dissociate into ions at a pKa of 9.23. Thus, to keep boron in non-ionic form (i.e., boric acid), the pH of the feed stream can be controlled to 9.23 or lower. As the pH value is decreased, so too is the number of borate ions in solution.

In some embodiments, electrochemical processes may include flash evaporation to promote salt crystallization and/or a solvent recovery stream to help replenish the inlet organic solvent brine stream of the electrodialysis unit should it be diluted via osmosis or electro-osmosis.

In some embodiments, provided are water treatment systems, the water treatment system comprising: an electrodialysis unit comprising an inlet feed stream, an inlet brine stream, an outlet product stream, and an outlet brine stream; and a precipitation tank comprising an inlet stream and an outlet supernatant stream, wherein the inlet stream of the precipitation tank comprises the outlet brine stream of the electrodialysis unit, and the inlet brine stream of the electrodialysis device comprises the outlet supernatant stream of the precipitation tank, and wherein the inlet brine stream and the outlet brine stream of the electrodialysis unit comprise an organic solvent.

In some embodiments of the water treatment system, a salt concentration of the outlet product stream is greater than a salt concentration of the outlet brine stream of the electrodialysis unit.

In some embodiments of the water treatment system, the inlet brine stream and the outlet brine stream of the electrodialysis unit comprise a water and organic solvent composition.

In some embodiments of the water treatment system, the water and organic solvent composition of the inlet brine stream comprises 2-20 wt. % water.

In some embodiments of the water treatment system, the organic solvent comprises at least one of ethanol or isopropanol.

In some embodiments of the water treatment system, the salt concentration of the outlet product stream is less than that of the inlet feed stream.

In some embodiments of the water treatment system, the salt concentration of the outlet product stream is 50-80 wt. % that of the inlet feed stream.

In some embodiments of the water treatment system, the salt concentration of the inlet brine stream is less than that of the outlet brine stream.

In some embodiments of the water treatment system, the salt concentration of the inlet brine stream is 30-60 wt. % that of the outlet brine stream.

In some embodiments of the water treatment system, the salt concentration of the outlet brine stream is less than that of the outlet product stream.

In some embodiments of the water treatment system, the salt concentration of the outlet brine stream is 30-70 wt. % that of the outlet product stream.

In some embodiments of the water treatment system, the outlet supernatant stream of the precipitation tank comprises a supernatant.

In some embodiments of the water treatment system, the water treatment system comprises a screw conveyor configured to remove precipitated salts from the precipitation tank.

In some embodiments of the water treatment system, the precipitation tank comprises a flash valve configured to flash off a fraction of the solution of outlet brine stream as vapor to accelerate salt precipitation.

In some embodiments of the water treatment system, the water treatment system comprises a solvent recovery step configured to replenish organic solvent in the inlet brine stream.

In some embodiments of the water treatment system, the inlet feed stream is controlled to a pH of 9 or less.

In some embodiments of the water treatment system, the inlet feed stream is controlled to a pH of 7 or less.

In some embodiments of the water treatment system, the dissolved salts comprise one or more of sodium chloride, lithium carbonate, boric acid, sodium sulfate, lithium hydroxide, sodium bicarbonate, or potassium chloride.

In some embodiments, a method of separating dissolved salts from a feed stream is provided, the method comprising: passing water through an electrodialysis unit configured to separate dissolved salts from a feed stream, wherein the electrodialysis unit comprises an inlet feed stream, an inlet brine stream, an outlet product stream, and an outlet brine stream; routing the outlet brine stream of the electrodialysis unit to a precipitation tank to allow the dissolved salts to precipitate from solution, wherein the precipitation tank comprises an inlet stream and an outlet supernatant stream; and routing the outlet supernatant stream from the precipitation tank to the electrodialysis unit, wherein the inlet brine stream of the electrodialysis unit comprises the outlet supernatant stream of the precipitation tank, wherein the inlet brine stream and the outlet brine stream of the electrodialysis unit comprise an organic solvent.

In some embodiments of the method, a salt concentration of the outlet product stream is greater than a salt concentration of the outlet brine stream of the electrodialysis unit.

In some embodiments of the method, the inlet brine stream and the outlet brine stream of the electrodialysis unit comprise a water and organic solvent composition.

In some embodiments of the method, the water and organic solvent composition of inlet brine stream comprises 2-20 wt. % water.

In some embodiments of the method, the organic solvent comprises at least one of ethanol or isopropanol.

In some embodiments of the method, the salt concentration of the outlet product stream is less than that of the inlet feed stream.

In some embodiments of the method, the salt concentration of the outlet product stream is 50-80 wt. % that of the inlet feed stream.

In some embodiments of the method, the salt concentration of inlet brine stream is less than that of outlet brine stream.

In some embodiments of the method, the salt concentration of the inlet brine stream is wt. % that of the outlet brine stream.

In some embodiments of the method, the salt concentration of the outlet brine stream is less than that of the outlet product stream.

In some embodiments of the method, the salt concentration of outlet brine stream is wt. % that of the outlet product stream.

In some embodiments of the method, the outlet supernatant stream of the precipitation tank comprises a supernatant.

In some embodiments of the method, the method comprises removing precipitated salts from the precipitation tank using a screw conveyor.

In some embodiments of the method, the method comprise flashing off a fraction of the solution of the outlet brine stream as vapor to accelerate salt precipitation.

In some embodiments of the method, the method comprises recovering the organic solvent with a solvent recovery step configured to replenish organic solvent in the inlet brine stream.

In some embodiments of the method, the solvent recovery step comprises a distillation column and a condenser.

In some embodiments of the method, the inlet feed stream is controlled to a pH of 9 or less.

In some embodiments of the method, the inlet feed stream is controlled to a pH of 7 or less.

In some embodiments of the method, the dissolved salts comprise one or more of sodium chloride, lithium carbonate, boric acid, sodium sulfate, lithium hydroxide, sodium bicarbonate, or potassium chloride.

BRIEF DESCRIPTION OF THE FIGURES

The invention will now be described, by way of example only, with reference to the accompanying drawings, in which.

DETAILED DESCRIPTION OF THE DISCLOSURE

Figure 1:
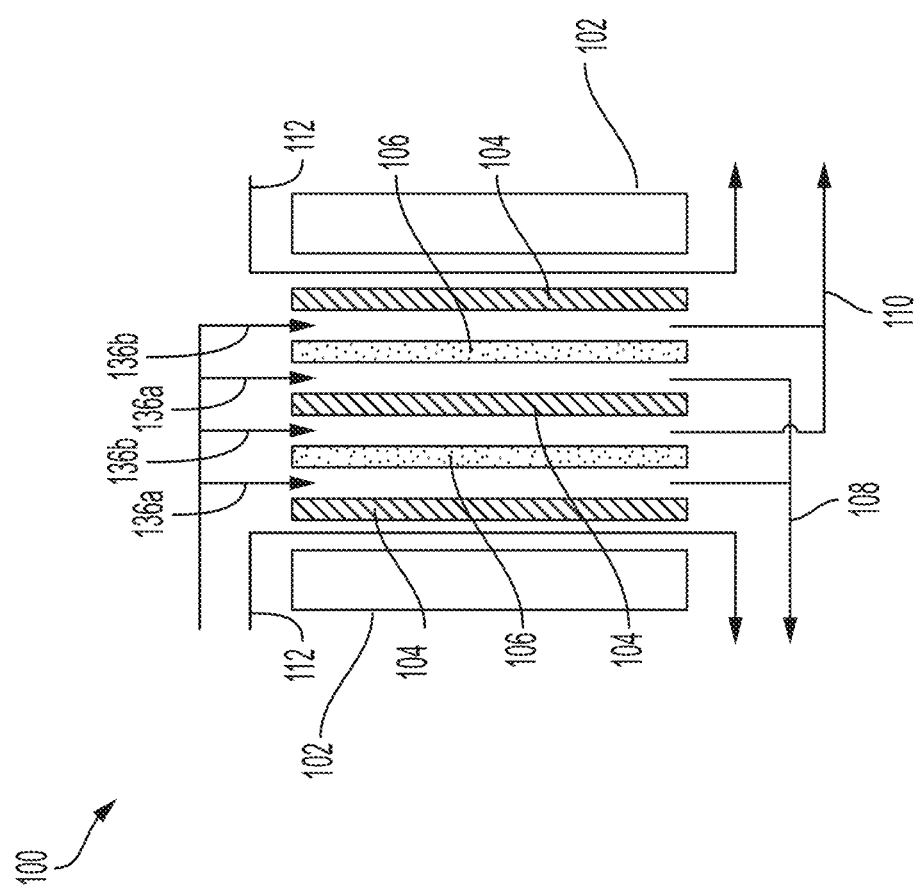
FIG. 1 shows a schematic representation of an electrochemical ion separation device, according to some embodiments.

Provided are electrochemical processes for separating charged chemical species from an aqueous feed stream using an organic solvent in a brine stream. Processes provided herein are capable of achieving a super saturated solution while requiring a relatively low amount of energy. Organic solvents, such as those that may be used as the brine stream in electrochemical processes provided herein, typically have a low solubility for charged ions. Thus, electrochemical processes provided can have a positive chemical gradient between the aqueous feed stream and the organic solvent brine stream. This is in contrast to electrochemical processes having an aqueous brine stream. Because aqueous brine streams have a much greater solubility, they become more highly concentrated during the electrodialysis process. Conversely, an organic solvent brine stream having a lower solubility will likely be less concentrated than the feed stream. This will produce a positive chemical gradient. A positive chemical gradient reduces the resistance of charged ions from moving to the organic brine stream from the aqueous feed stream. Dissolved salts in the resulting brine stream may be precipitated out of solution and the supernatant of the brine stream may be collected and returned to the electrochemical process for further concentration. Example dissolved salts can include, but are not limited to, sodium chloride, lithium carbonate, boric acid, sodium sulfate, lithium hydroxide, sodium bicarbonate, and potassium chloride.

As described above, the organic solvent brine stream has a low solubility for dissolved ions as compared to water. For example, suitable organic solvents that may be used as brine streams in electrodialysis processes provided herein include ethanol, isopropanol, and other alkyl alcohols, as well as ketones, such as acetone, methyl ethyl ketone (MEK), etc. One common dissolved species, sodium chloride, has a solubility of ~0.360,000 mg/L in water, but a solubility of only 650 mg/L in pure ethanol, 30 mg/L in isopropanol, and 0.42 mg/L in acetone. Additionally, the organic solvent also has a high vapor pressure as compared to water, meaning that the solvent will more readily evaporate relative to water.

Using an organic solvent brine stream having a relatively low salt solubility can allow for an electrodialysis process to produce a super saturated solution with greatly reduced energy requirement. The amount of current applied to the process can be two to three orders of magnitude less than what would otherwise be necessary to achieve the same relative levels of saturation in a system using an aqueous brine stream.

In some embodiments, the brine stream may comprise some water in addition to an organic solvent. The presence of water in the brine stream, even in electrodialysis systems provided herein that are characterized with brine streams comprising predominantly of organic solvent, can reduce the amount of water osmosis across the ion-exchange membranes of electrodialysis devices. Although the presence of water in the brine stream will increase the solubility of dissolved ions, it will also help prevent loss of water in the feed stream.

Once the ions are transferred into the brine stream, the brine stream is separated from the electrodialysis cell. It is introduced to a tank that provides residence time for the separation to occur (i.e., salting out). Once the precipitation occurs, the supernatant may be collected and returned to the electrochemical cell for further concentration. The salts collected may be dried or removed using methods such as centrifugation and filter pressing.

In some embodiments, it may be beneficial to concentrate the brine to just below the saturation point. The solution may then be super saturated by flashing off the organic solvent of the supernatant. Due to the high vapor pressure of the organic solvent relative to water, the energy required for flash evaporation and/or distillation is less than that which would be required for an aqueous solution. Using flash evaporation may be used when multiple species are present in the brine stream, particularly in cases in which it is desirable to perform multi-stage distillation to remove dissolved species in separate steps.

If water osmotes across the ion exchange membrane into the brine stream, a solvent recovery step may be performed to ensure that the concentration of organic solvent remains at levels that allow for precipitation. The solvent recovery step may be composed of a stripping column or fractional distillation to separate the water from organic solvent. Molecular sieves may be used to further purify the solvent if such a step is desirable.

Provided below is a discussion of the basic operation of an individual electrodialysis device according to some embodiments and with respect to FIG. 1. Electrodialysis systems and methods for separating ions using an organic solvent brine stream provided herein may include one or more individual electrodialysis devices.

An individual electrodialysis device (i.e., an ion-exchange device) can include at least one pair of electrodes and at least one pair of ion-exchange membranes placed there between. The at least one pair of ion-exchange membranes can include a cation-exchange membrane ("CEM") and an anion-exchange membrane ("AEM"). In addition, at least one of the ion-exchange membranes (i.e., CEMs and/or AEMs) has a spacer on the surface of the ion-exchange membrane facing the other ion-exchange membrane in an electrodialysis device. In some embodiments, both the CEMs and the AEMs have a spacer on at least one surface facing the other ion-exchange membrane. The spacer can include a spacer border and a spacer mesh.

FIG. 1 shows a schematic side view of electrodialysis device 100 according to some embodiments disclosed herein. Electrodialysis device 100 can include CEMs 104 and AEMs 106 sandwiched between two electrodes 102. In some embodiments, one or more CEM 104 and one or more AEM 106 may alternate throughout a length of the electrodialysis device 100.

An electrode 102 is shown on opposing ends of electrodialysis device 100. One electrode 102 can be a cathode and another electrode 102 can be an anode. In some embodiments, one or more electrodes 102 can encompass one or more fluid channels for electrolyte stream 112. Electrolyte stream 112 may comprise raw influent, a separately-managed electrolyte fluid, a sodium chloride solution, sodium sulfate, iron chloride, or another suitable conductive fluid. For example, a fluid channel for electrolyte stream 112 of electrode 102 can be located between one or more CEM 104 and an electrode 102, or between one or more AEM 106 and an electrode 102. Electrodialysis device 100 may also include one or more fluid channels for influent streams 136a and 136b. Influent streams 136a and 136b may be located between a CEM 104 and an AEM 106. Influent streams 136a and 136b can comprise water. In some embodiments, water of influent streams 136a and 136b may be purified by flowing through one or more intermembrane chambers located between two or more alternating CEM 104 and AEM 106. In particular, influent stream 136a may flow through electrodialysis device 100 and exit electrodialysis device 100 as brine stream 108. Influent stream 136b may flow through electrodialysis device 100 and exit electrodialysis device 100 as product stream 110. Thus, influent stream 136a is a brine inlet stream for electrodialysis device 100, and influent stream 136b is a product inlet stream for electrodialysis device 100 of FIG. 1. Of course, the ionic composition of the streams within each channel may change when an electric current is applied to the device, allowing ions to migrate from one channel to an adjacent channel.

AEM 106 can allow passage of negatively charged ions and can substantially block the passage of positively charged ions. Conversely, CEM 104 can allow the passage of positively charged ions and can substantially block the passage of negatively charged ions.

Electrolyte stream 112 may be in direct contact with one or more electrodes 102. In some embodiments, electrolyte stream 112 may comprise the same fluid as the fluid of influent streams 136a and 136b. In some embodiments, electrolyte stream 112 may comprise a fluid different from the fluid of influent streams 136a and 136b. For example, electrolyte stream 112 can be any one or more of a variety of conductive fluids including, but not limited to, raw influent, a separately managed electrolyte fluid, sodium chloride solution, sodium sulfate solution, or iron chloride solution.

In some embodiments, electrodialysis device 100 can include one or more spacers on at least one surface of a CEM 104 or an AEM 106. In some embodiments, one or more spacer may be located on two opposing surfaces of a CEM 104 and/or an AEM 106. Further, electrodialysis device 100 may include one or more spacers between any two adjacent ion-exchange membranes (i.e., between an AEM 106 and a CEM 104). The region formed between any two adjacent ion-exchange membranes by one or more spacers forms an intermembrane chamber.

When an electric charge is applied to one or more electrodes 102 of electrodialysis device 100, the ions of influent streams 136a and 136b flowing through an intermembrane chamber between any two ion-exchange membranes (i.e., one or more CEM 104 and one or more AEM 106) can migrate towards the electrode of opposite charge. Specifically, ion-exchange membranes can comprise ionically conductive pores having either a positive or a negative charge. These pores can be permselective, meaning that they selectively permeate ions of an opposite charge. Thus, the alternating arrangement of the ion-exchange membranes can generate alternating intermembrane chambers comprising decreasing ionic concentration and comprising increasing ionic concentration as the ions migrate towards the oppositely-charged electrode 102.

An intermembrane chamber can be formed from a spacer border and a spacer mesh and can create a path for fluids to flow. The number of intermembrane chambers may be increased by introducing additional alternating pairs of ion-exchange membranes. Introducing additional alternating pairs of CEMs 104 and AEMs 106 (and the intermembrane chambers formed between each pair of ion-exchange membranes) can also increase the capacity of electrodialysis device 100. In addition, the functioning ability of an individual ion-exchange cell (i.e., a single CEM 104 paired with a single AEM 106 to form a single intermembrane chamber) can be greatly augmented by configuring ion-exchange cells into ion-exchange stacks (i.e., a series of multiple ion-exchange cells.)

As described above, ions of influent streams 136a and 136b flowing through an intermembrane chamber can migrate towards electrode 102 of opposite charge when an electric current is applied to electrodialysis device 100. The ion-exchange membranes have a fixed charge (CEMs have a negative charge, AEMs have a positive charge). Thus, as a counter-ion approaches an ion-exchange membrane (e.g., as a cation approaches a CEM), the counter-ion is freely exchanged through the membrane. The removal of this counter-ion from the stream makes the stream a product stream. On the other hand, when a co-ion approaches the ion-exchange membrane (e.g., as an anion approaches a CEM), it is electrostatically repelled from the CEM. This separation mechanism can separate influent streams 136a and 136b into two different streams of opposite ionic charge. For example, when used for desalination, influent stream 136a may flow to brine stream 108, and influent stream 136b may flow to product stream 110. Brine stream 108 is generally a waste stream. In some embodiments, product stream 110 may have a lower ionic concentration than brine stream 108.

In some embodiments, product stream 110 may have a predetermined treatment level. For example, ion-exchange system 100 may be configured to remove several types of ions (e.g., monovalent ions, divalent ions, etc.) or it may be configured to remove a specific type of ion (e.g., arsenic, fluoride, perchlorate, lithium, gold, silver, etc.). Further, ion-exchange system 100 can be held together using a compression system that comprises using two compression plates on opposite ends of the device. In some embodiments, a single pair of compression plates may be used (i.e., one on either end of the outside of the stack) to achieve a working, reliable seal.

Figure 2:
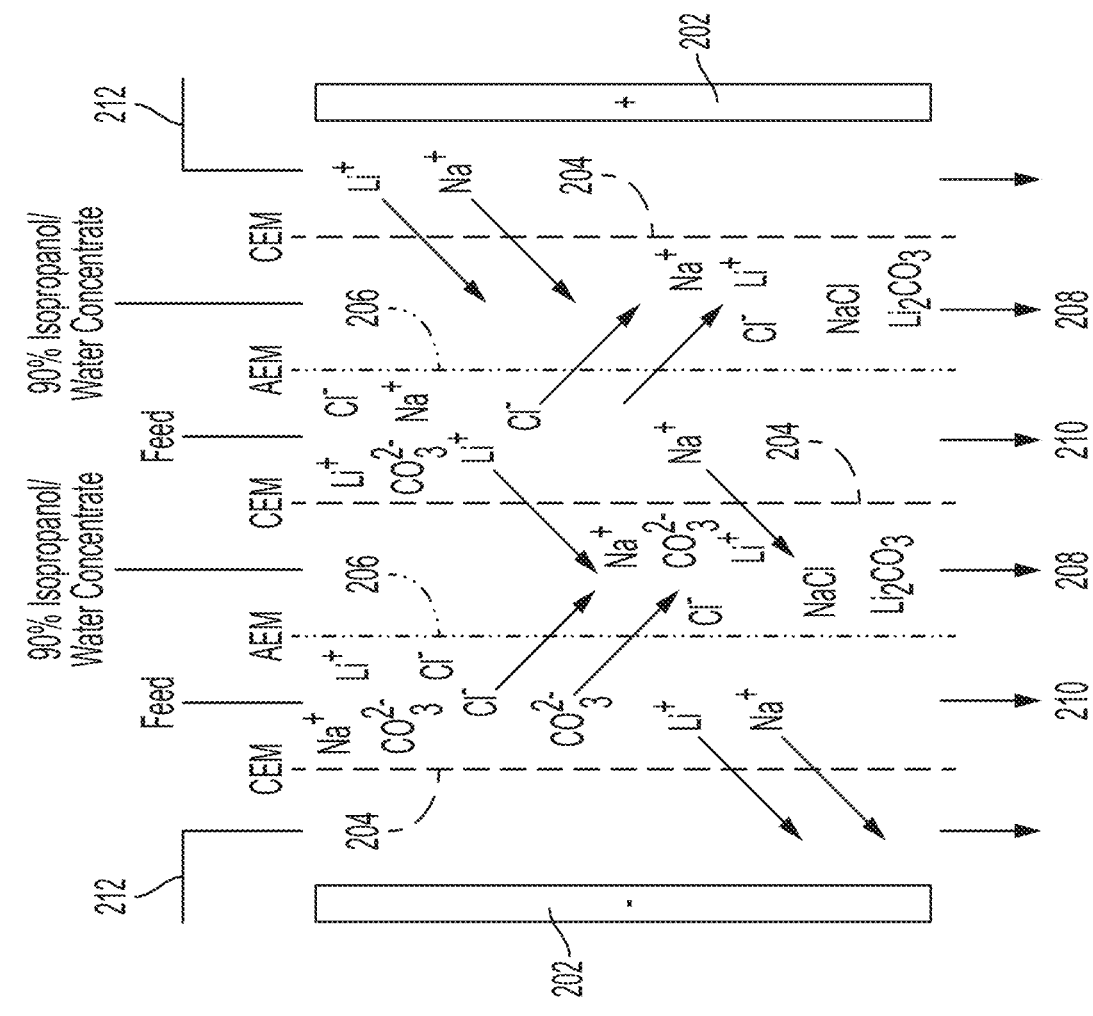
FIG. 2 shows a schematic representation of an electrodialysis device treating a feed stream with an organic solvent brine stream, according to some embodiments.

FIG. 2 shows the basic operation of an electrodialysis device 200 using an organic solvent brine stream. Electrodialysis device 200 can include a pair of electrodes 202, an electrolyte stream 212, a plurality of CEMs 204, a plurality of AEMs 206, influent stream 236, inlet brine stream 238, output product stream 210, and output brine stream 208.

As explained with reference to FIG. 1, above, when a potential is applied across the electrodes 202 of the electrodialysis device 200, ions within the streams begin to migrate across the ion exchange membranes. The dissolved, salt ions that are transferred from influent stream 236 to organic solvent brine stream 238 may become saturated within brine stream 238 and precipitate from the brine stream as a solid crystal. In some embodiments, this precipitation may occur in a precipitation tank after the dissolved ions have been transferred by electrodialysis device 200. Particularly if the induction time for precipitation is known, a system can be designed such that the precipitation occurs outside of electrodialysis device 200. This concept (i.e., a precipitation tank) is explained further with respect to FIGS. 4-6.

In some embodiments, inlet brine stream (i.e., organic solvent brine stream) 238 may comprise entirely of an organic solvent. In some embodiments, inlet brine stream 238 may include a mixture of water and an organic solvent. While the organic solvent has a low salt solubility and high vapor pressure with respect to water, which may allow for a positive concentration gradient between influent stream 236 and inlet brine stream 238, including some water in inlet brine stream 238 comes with benefits as well. In particular, anhydrous alcohols tend to quickly hydrate themselves, so a purely organic solvent as inlet brine stream 238 is impractical. If this were the case, water from influent stream 236 would osmote or transfer across the ion-exchange membranes of electrodialysis device 200 and into inlet brine stream 238. Further, the presence of water in inlet brine stream 238 reduces the osmotic pressure observed by the ion-exchange membranes. A high osmotic pressure will exist when there is a great difference in water concentrations between influent stream 236 and inlet brine stream 238. By including some water in inlet brine stream 238, the difference in water concentration between influent stream 236 and inlet brine stream 238 is decreased as well as the osmotic pressure in the ion-exchange membranes located between influent stream 236 and inlet brine stream 238.

In some embodiments, inlet brine stream 238 comprises 1-40 wt. % water and 60-98 wt. % organic solvent. In some embodiments, inlet brine stream 238 comprises 1-10 wt. %, 2-20 wt. %, 5-30 wt. %, or 10-20 wt. % water. In some embodiments, inlet brine stream 238 comprises less than 40 wt. %, less than 35 wt. %, less than 30 wt. %, less than 25 wt. %, less than wt. %, less than 15 wt. %, less than 10 wt. %, less than 5 wt. %, or less than 2 wt. % water. In some embodiments, inlet brine stream may comprise more than 1 wt. %, more than 2 wt. %, more than 5 wt. %, more than 10 wt. %, more than 15 wt. %, more than 20 wt. %, more than 25 wt. %, more than 30 wt. %, or more than 35 wt. % water.

In some embodiments, inlet brine stream 238 comprises 70-95 wt. % or 80-90 wt. % organic solvent. In some embodiments, inlet brine stream 238 comprises less than 98 wt. %, less than 95 wt. %, less than 90 wt. %, less than 85 wt. %, less than 80 wt. %, less than 75 wt. %, less than 70 wt. %, or less than 65 wt. % organic solvent. In some embodiments, inlet brine stream 238 comprises more than 60 wt. %, more than 65 wt. %, more than 70 wt. %, more than 75 wt. %, more than 80 wt. %, more than 85 wt. %, more than 90 wt. %, or more than 95 wt. % organic solvent. Suitable organic solvents can include isopropanol, ethanol, other alkyl alcohols, ketones, such as acetone, methyl ethyl ketone, etc.

Figure 3:
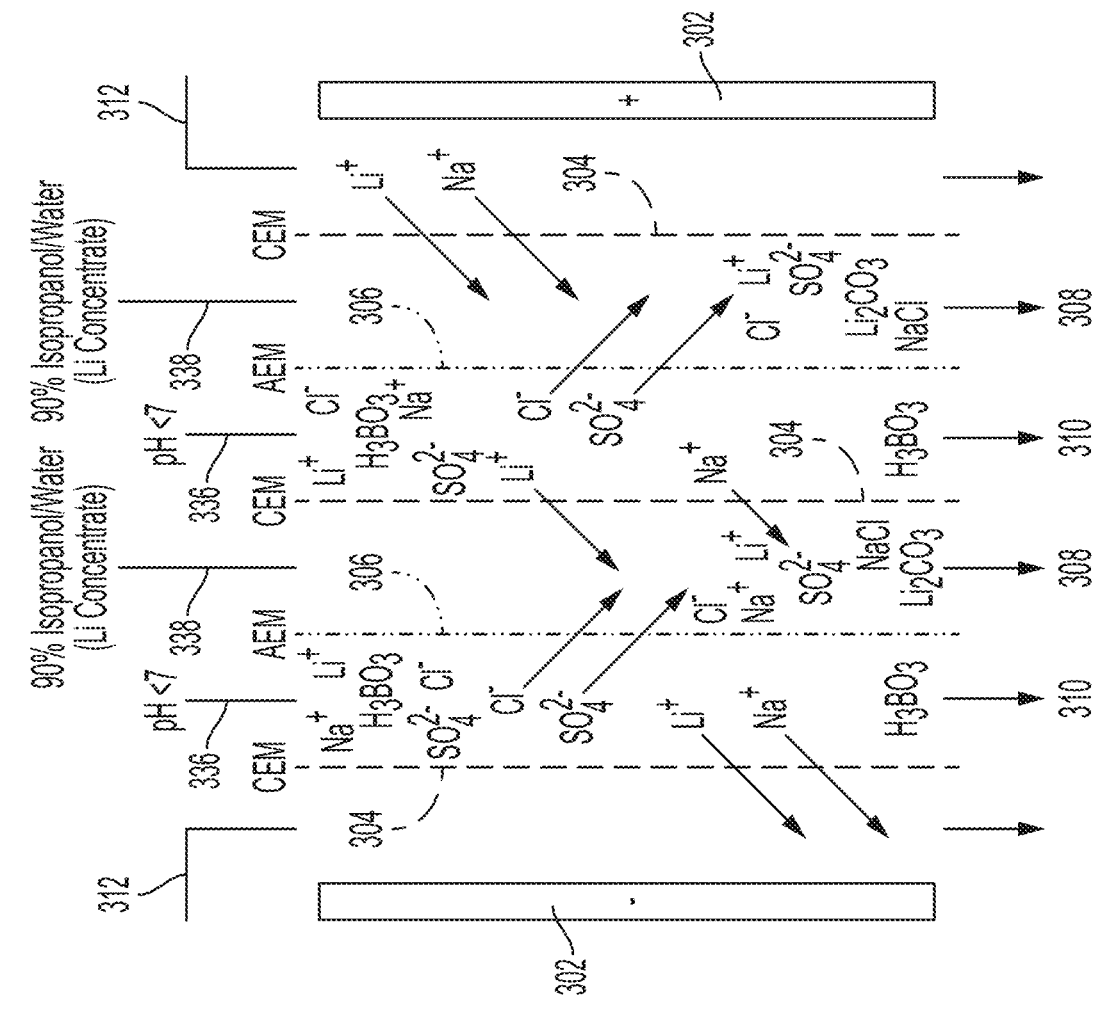
FIG. 3 shows a schematic representation of an electrodialysis device treating a pH-modulated feed stream with an organic solvent brine stream, according to some embodiments.

FIG. 3 shows electrodialysis device 300 for separating dissolved ions from an influent/feed stream using an organic solvent brine stream. The pH of the influent feed stream of electrodialysis device 300 is controlled. In some embodiments, pH control can help control the transfer of specific dissolved species. Electrodialysis device 300 can include a pair of electrodes 302, an electrolyte stream 312, a plurality of CEMs 304, a plurality of AEMs 306, influent stream 336, inlet brine stream 338, output product stream 310, and output brine stream 308.

In some embodiments, the presence of boron in influent stream 336 and in the solids produced by precipitation may be undesirable. In particular, this can be the case in the treatment of lithium brines mined for producing lithium carbonate for lithium ion batteries. By lowering the pH of influent stream 336, most of the boron will remain in boric acid form, which is unaffected by the ionic current in electrodialysis device 300. While other methods of lithium recovery require boron concentration and separation in at least two separate steps, electrodialysis device 300 can concentrate and separate boron in a single step. In some embodiments, electrodialysis device 300 is designed to remove dissolved species such as lithium carbonate, lithium hydroxide, and co-precipitates from electrodialysis device 300 prior to precipitation or crystal formation.

In some embodiments, influent stream 336 may comprise boron and/or boric acid. In aqueous solution, boron typically exists as boric acid ($H_3BO_3$). However, boric acid readily dissociates into ions according to the equation below, having a pKa of 9.23:

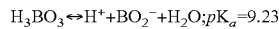

$$H_3BO_3 \leftrightarrow H^+ + BO_2^- + H_2O; pK_a = 9.23$$

Thus, if the pH of the aqueous solution is controlled to a level below 9.23, boric acid less readily dissociates. As the pH of aqueous solution decreases, so too does the number of dissociated ions. Accordingly, influent stream 336 of electrodialysis device 300 may be controlled to a pH lower than 9.23 to limit the rate of boric acid dissociation.

When the pH of influent stream 336 is controlled to a level below 9.23, boron has a tendency to remain in boric acid form. At a higher pH (i.e., 9.23 or higher), boric acid has a tendency to dissociate into ions according to the equation provided above. Because the pKa of the equation is 9.23, boric acid tends to resist dissociation more as the pH decreases. Acids such as sulfuric acid, hydrochloric acid, or citric acid may be used to control the pH. In some embodiments, influent stream 336 may be controlled to a pH of less than 9, less than 8.5, less than 8, less than 7.5, or less than 7.

As shown in the Figure, influent stream 336 comprises dissolved species such as sodium ions, lithium ions, boric acid, sulfate, and chlorine ions. So long as the pH of influent stream 336 remains below 9.23, the boron should remain in boric acid form. However, the lower the pH, generally the better. Because boric acid is non-ionic, it will not migrate across a membrane, and will instead stay within the channel between the CEM 304 and the AEM 306 that it is routed to. Thus, the boric acid of influent stream 336 will pass through electrodialysis device 300 without migration across any membranes, and will exit electrodialysis device 300 with output product stream 310. Conversely, the dissolved ions in influent stream 336—sodium ions, lithium ions, sulfate, and chlorine ions—will migrate across at least one membrane and towards the electrode of opposite charge. Thus, the sulfate and chlorine ions, both of which are negatively-charged, will migrate across the adjacent anion-exchange membrane 306 and towards electrode 302 having a positive charge. Similarly, the lithium and sodium ions, both of which are positively-charged, will migrate across the adjacent cation-exchange membrane 304 and towards electrode 302 of negative charge. Only boric acid (and any other non-ionic species) will remain in the influent stream 336 and exit electrodialysis device 300 with product stream 310. The ionic species that have migrated across an ion-exchange membrane will exit electrodialysis device in output brine stream 308.

Figure 4:
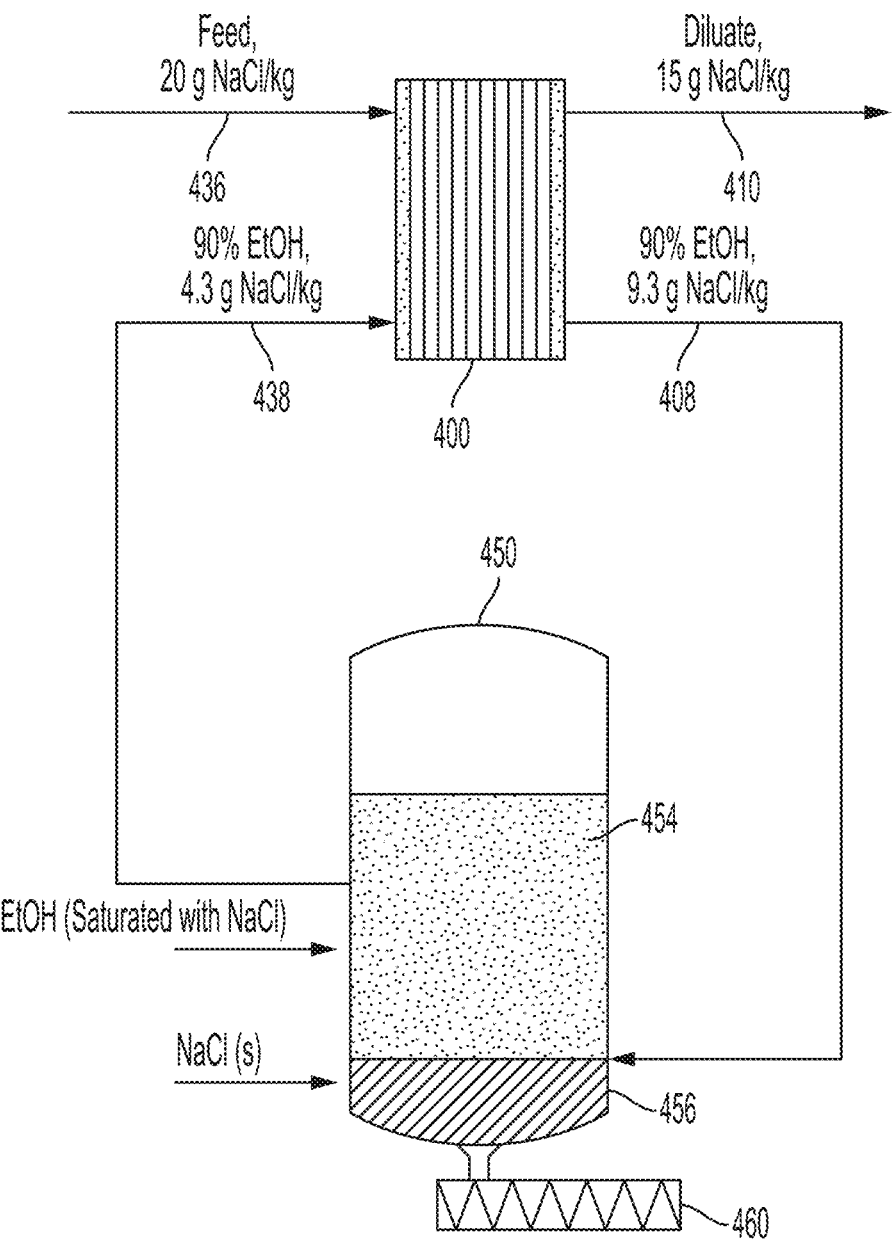
FIG. 4 shows a process flow diagram for an electrodialysis process including a precipitation tank for saturated salts formed in the organic solvent brine stream, according to some embodiments.

FIG. 4 shows a process flow diagram for separating and precipitating dissolved salts from a feed stream using an organic solvent brine stream. As shown, FIG. 4 includes electrodialysis device 400, precipitation tank 450, and screw conveyer 460. The stream in the process include influent stream 436, inlet brine stream 438, outlet product stream 410, and outlet brine stream 408.

As shown, the process of FIG. 4 includes a single electrodialysis device 400. However, electrodialysis processes according to embodiments provided herein may comprise any number of electrodialysis devices from one to ten. Additionally, a single precipitation tank 450 is shown in FIG. 4. However, the number of precipitation tanks in electrodialysis processes according to embodiments provided herein may increase as the number of electrodialysis devices increases.

Influent stream 436 comprises an amount of dissolved salts that are to be separated from influent stream 436 and into inlet brine stream 438 as the two streams pass through electrodialysis device 400. The salt concentration of outlet product stream 410 is less than that of influent stream 436. In some embodiments, the salt concentration of outlet product stream 410 is wt. %, 20-70 wt. %, 30-60 wt. %, or 50-80 wt. % of the salt concentration of influent stream 436. In some embodiments, the salt concentration of outlet product stream 410 is 50-80 wt. % of the salt concentration of influent stream 436. In some embodiments, the salt concentration of outlet product stream 410 is less than 80 wt. %, less than 70 wt. %, less than 60 wt. %, less than 50 wt. %, less than 40 wt. %, less than 30 wt. %, or less than 20 wt. % of the salt concentration of influent stream 436. In some embodiments, the salt concentration of outlet product stream 410 is greater than 10 wt. %, greater than 20 wt. %, greater than 30 wt. %, greater than 40 wt. %, greater than 50 wt. %, greater than 60 wt. %, or greater than 70 wt. %.

Outlet brine stream 408 comprises a greater concentration of dissolved salts than that of inlet brine stream 438. Specifically, outlet brine stream 408 comprises dissolved salts that have been transferred from influent stream 436 to the brine stream as the streams pass through electrodialysis device 400. In some embodiments, the salt concentration of inlet brine stream is less than that of outlet brine stream 408. In some embodiments, the salt concentration of inlet brine stream 438 may be 20-80 wt. %, 30-70 wt. %, 30-60 wt. %, or 40-50 wt. % that of outlet brine stream 408. In some embodiments, the salt concentration of inlet brine stream may be less than 80 wt. %, less than 70 wt. %, less than 60 wt. %, less than 50 wt. %, less than 40 wt. %, or less than 30 wt. % that of outlet brine stream 408. In some embodiments, the salt concentration of inlet brine stream may be more than 20 wt. %, more than 30 wt. %, more than 40 wt. %, more than 50 wt. %, more than 60 wt. %, or more than 70 wt. % that of outlet brine stream 408.

In some embodiments, the salt concentration of outlet brine stream 408 is less than that of product stream 410. In some embodiments, outlet brine stream 408 may be super saturated with dissolved salts. In some embodiments, the salt concentration of outlet brine stream 408 is 20-80 wt. %, 30-70 wt. %, or 40-60 wt. % that of product stream 410. In some embodiments, the salt concentration of outlet brine stream 408 is less than 80 wt. %, less than 70 wt. %, less than 60 wt. %, less than 50 wt. %, less than 40 wt. %, or less than 30 wt. % that of product stream 410. In some embodiments, the salt concentration of outlet brine stream is more than 20 wt. %, more than 30 wt. %, more than 40 wt. %, more than 50 wt. %, more than 60 wt. %, or more than 70 wt. % that of product stream 410.

The separation process of FIG. 4 includes precipitation tank 450 and screw conveyor 460. Outlet brine stream 408 is fed to precipitation tank 450, where the dissolved salts of brine stream 408 are allowed to precipitate out of solution. In some embodiments, inlet brine stream 438 (i.e., inlet brine stream for electrodialysis device 400) may comprise supernatant 454, which is generated in precipitation tank 450 when the dissolved salts are separated from solution and form solid crystals 456. Solid crystals 456 may be removed from precipitation tank 450 using screw conveyor 460.

In some embodiments, outlet brine stream 408 may be introduced to precipitation tank 450 at a location that is vertically at or below the top surface of solid crystals 456. By depositing outlet brine stream 408 at or below the top surface of solid crystals 456, the stream is exposed to a high surface area (i.e., the high surface area generated by solid crystals 456). A high surface area can promote nucleation of crystals, thus increasing the efficiency of precipitation. Additionally, the density of the saturated solution will cause a gradient to form within precipitation tank 450, with the most dilute solution near the top of the fluid column. In some embodiments, baffles or packing may be included to help with the settling of the crystals they form throughout the height of the column.

Figure 5:
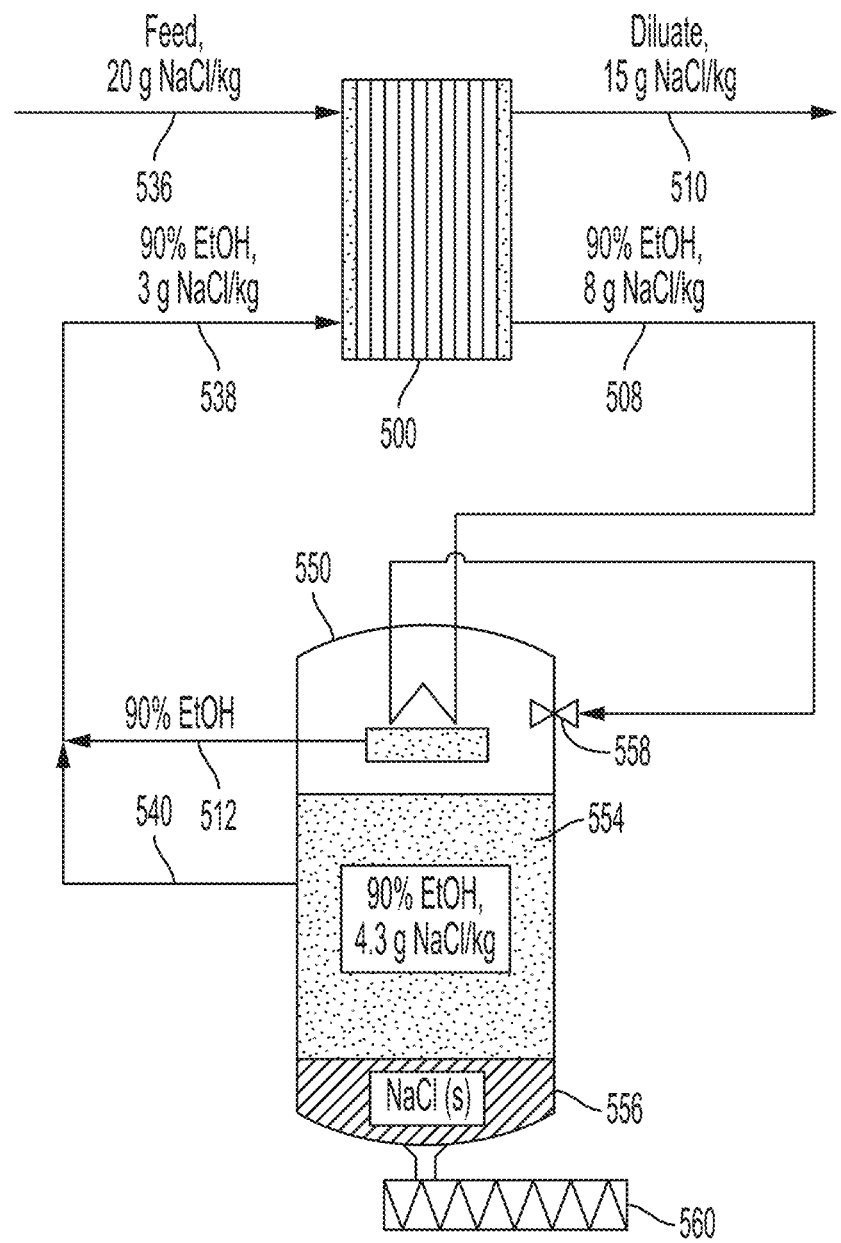
FIG. 5 shows a process flow diagram for an electrodialysis process including an organic solvent brine stream and a precipitation tanks including a flash evaporation feature, according to some embodiments.

FIG. 5 also shows a process flow diagram for separating and precipitating dissolved salts from a feed stream using an organic solvent brine stream. As shown, FIG. 5 includes electrodialysis device 500, precipitation tank 550, screw conveyer 560, and valve 558. The streams in the process include influent stream 536, inlet brine stream 538, outlet product stream 510, and outlet brine stream 508.

As shown, the process of FIG. 5 includes a single electrodialysis device 500. However, electrodialysis processes according to embodiments provided herein may comprise any number of electrodialysis devices from one to ten. Additionally, a single precipitation tank 550 is shown in FIG. 5. However, the number of precipitation tanks in electrodialysis processes according to embodiments provided herein may increase as the number of electrodialysis devices increases.

Influent stream 536 comprises an amount of dissolved salts that are to be separated from influent stream 536 and into inlet brine stream 538 as the two streams pass through electrodialysis device 500. The salt concentration of outlet product stream 510 is less than that of influent stream 536. In some embodiments, the salt concentration of outlet product stream 510 is wt. %, 20-70 wt. %, 30-60 wt. %, or 50-80 wt. % of the salt concentration of influent stream 536. In some embodiments, the salt concentration of outlet product stream 510 is 50-80 wt. % of the salt concentration of influent stream 536. In some embodiments, the salt concentration of outlet product stream 510 is less than 80 wt. %, less than 70 wt. %, less than 60 wt. %, less than 50 wt. %, less than 40 wt. %, less than 30 wt. %, or less than 20 wt. % of the salt concentration of influent stream 536. In some embodiments, the salt concentration of outlet product stream 510 is greater than 10 wt. %, greater than 20 wt. %, greater than 30 wt. %, greater than 40 wt. %, greater than 50 wt. %, greater than 60 wt. %, or greater than 70 wt. %.

Outlet brine stream 508 comprises a greater concentration of dissolved salts than that of inlet brine stream 538. Specifically, outlet brine stream 508 comprises dissolved salts that have been transferred from influent stream 536 to the brine stream as the streams pass through electrodialysis device 500. In some embodiments, the salt concentration of inlet brine stream is less than that of outlet brine stream 508. In some embodiments, the salt concentration of inlet brine stream 538 may be 20-80 wt. %, 30-70 wt. %, 30-60 wt. %, or 40-50 wt. % that of outlet brine stream 508. In some embodiments, the salt concentration of inlet brine stream may be less than 80 wt. %, less than 70 wt. %, less than 60 wt. %, less than 50 wt. %, less than 40 wt. %, or less than 30 wt. % that of outlet brine stream 508. In some embodiments, the salt concentration of inlet brine stream may be more than 20 wt. %, more than 30 wt. %, more than 40 wt. %, more than 50 wt. %, more than 60 wt. %, or more than 70 wt. % that of outlet brine stream 508.

In some embodiments, the salt concentration of outlet brine stream 508 is less than that of product stream 510. In some embodiments, outlet brine stream 508 may be super saturated with dissolved salts. In some embodiments, the salt concentration of outlet brine stream 508 is 20-80 wt. %, 30-70 wt. %, or 40-60 wt. % that of product stream 510. In some embodiments, the salt concentration of outlet brine stream 508 is less than 80 wt. %, less than 70 wt. %, less than 60 wt. %, less than 50 wt. %, less than 40 wt. %, or less than 30 wt. % that of product stream 510. In some embodiments, the salt concentration of outlet brine stream is more than 20 wt. %, more than 30 wt. %, more than 40 wt. %, more than 50 wt. %, more than 60 wt. %, or more than 70 wt. % that of product stream 510.

The separation process of FIG. 5 includes precipitation tank 550, screw conveyor 560, and valve 558. Outlet brine stream 508 is fed to precipitation tank 550, where the dissolved salts of brine stream 508 are allowed to precipitate out of solution. In some embodiments, inlet brine stream 538 (i.e., inlet brine stream for electrodialysis device 500) may comprise supernatant 554, which is generated in precipitation tank 550 when the dissolved salts are separated from solution and form solid crystals 556. Solid crystals 556 may be removed from precipitation tank 550 using screw conveyor 560.

In some embodiments, the super saturated solution of outlet brine stream 508 is flashed by valve 558 above the fluid line of supernatant 554 in the headspace of precipitation tank 550. Flashing off at least a portion of the solution as vapor in this way can increase the salt concentration in the liquid phase of the solution by reducing the amount of organic solvent in the solution (i.e., outlet brine stream 508). This flashing process will further saturate the solution and can accelerate crystallization/precipitation of salts. The majority of liquid in precipitation tank 550 may remain at saturation concentration after the super saturated salt precipitates.

Once flashed off, the vapor phase may be condensed by a coil or heat exchanger in the headspace of precipitation tank 550 to form condensed solvent stream 512. In some embodiments, the effluent of electrodialysis device 500 may be preheated by the condensation of the vapor on the coil prior to passing through valve 558. Condensed solvent stream 512 may be substantially free of dissolved salts, allowing it to be used to dilute inlet brine stream 538 of electrodialysis device 500. Thus, in some embodiments, inlet brine stream 538 comprises condensed solvent stream 512. This dilution of condensed solvent stream 512 can also help ensure a minimum salt concentration in inlet brine stream 538. The amount of dilution of condensed solvent stream 512 depends on the fraction of vapor partitioned by flash valve 558.

In some embodiments, outlet brine stream 508 may be heated and/or pumped prior to reaching flash valve 558. Heating and/or pumping may increase the amount of vapor formed during the flash evaporation step.

Figure 6:
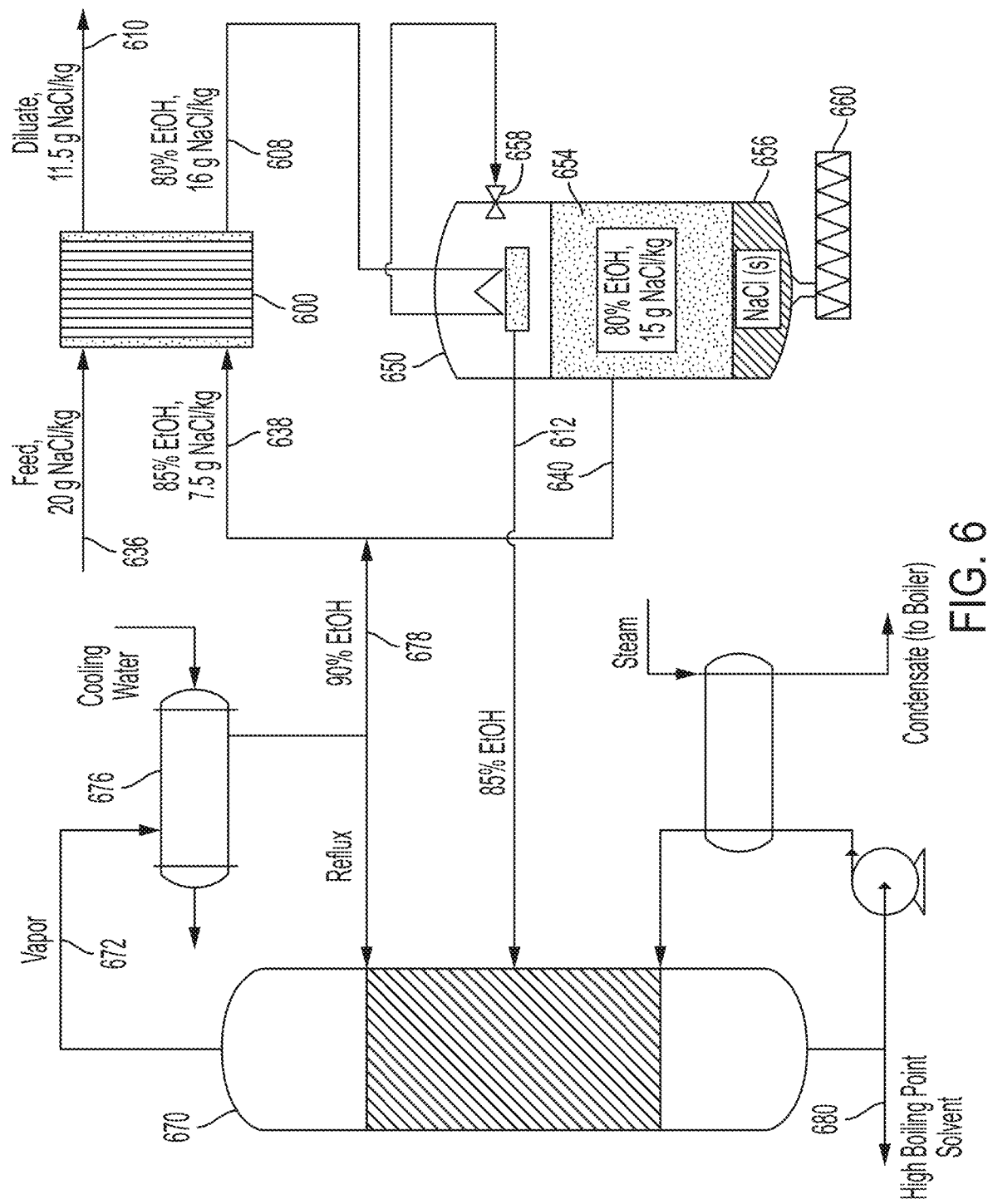
FIG. 6 shows a process flow diagram for an electrodialysis process using an organic solvent brine stream and including an additional solvent recovery step, according to some embodiments.

FIG. 6 also shows a process flow diagram for separating and precipitating dissolved salts from a feed stream using an organic solvent brine stream. Specifically, the process of FIG. 6 includes a solvent recovery step that can help replenish solvent that may become diluted over time. For example, dilution of the solvent (e.g., the composition of inlet brine stream 638), can occur by osmosis and electro-osmosis across the membranes of electrodialysis device 600. (Osmosis in electrodialysis device 600 may occur due to a gradient in water concentrations and, and electro-osmosis may occur due to solvation shells that accompany transferred ions.) This is described in more detail below. As shown, FIG. 6 includes electrodialysis device 600, precipitation tank 650, screw conveyer 660, and valve 658. The streams in the process include influent stream 636, inlet brine stream 638, outlet product stream 610, and outlet brine stream 608, as well as outlet supernatant stream 640, flash condensate stream 612, high boiling point solvent 680, vapor stream 672, and condensed solvent recovery stream 678.

As shown, the process of FIG. 6 includes a single electrodialysis device 600. However, electrodialysis processes according to embodiments provided herein may comprise any number of electrodialysis devices from one to ten. Additionally, a single precipitation tank 650 is shown in FIG. 6. However, the number of precipitation tanks in electrodialysis processes according to embodiments provided herein may increase as the number of electrodialysis devices increases.

Influent stream 636 comprises an amount of dissolved salts that are to be separated from influent stream 636 and into inlet brine stream 638 as the two streams pass through electrodialysis device 600. The salt concentration of outlet product stream 610 is less than that of influent stream 636. In some embodiments, the salt concentration of outlet product stream 610 is wt. %, 20-70 wt. %, 30-60 wt. %, or 50-80 wt. % of the salt concentration of influent stream 636. In some embodiments, the salt concentration of outlet product stream 610 is 50-80 wt. % of the salt concentration of influent stream 636. In some embodiments, the salt concentration of outlet product stream 610 is less than 80 wt. %, less than 70 wt. %, less than 60 wt. %, less than 50 wt. %, less than 40 wt. %, less than 30 wt. %, or less than 20 wt. % of the salt concentration of influent stream 636. In some embodiments, the salt concentration of outlet product stream 610 is greater than 10 wt. %, greater than 20 wt. %, greater than 30 wt. %, greater than 40 wt. %, greater than 50 wt. %, greater than 60 wt. %, or greater than 70 wt. %.

Outlet brine stream 608 comprises a greater concentration of dissolved salts than that of inlet brine stream 638. Specifically, outlet brine stream 608 comprises dissolved salts that have been transferred from influent stream 636 to the brine stream as the streams pass through electrodialysis device 600. In some embodiments, the salt concentration of inlet brine stream is less than that of outlet brine stream 608. In some embodiments, the salt concentration of inlet brine stream 638 may be 20-80 wt. %, 30-70 wt. %, 30-60 wt. %, or 40-50 wt. % that of outlet brine stream 608. In some embodiments, the salt concentration of inlet brine stream may be less than 80 wt. %, less than 70 wt. %, less than 60 wt. %, less than 50 wt. %, less than 40 wt. %, or less than 30 wt. % that of outlet brine stream 608. In some embodiments, the salt concentration of inlet brine stream may be more than 20 wt. %, more than 30 wt. %, more than 40 wt. %, more than 50 wt. %, more than 60 wt. %, or more than 70 wt. % that of outlet brine stream 608.

In some embodiments, the salt concentration of outlet brine stream 608 is less than that of product stream 610. In some embodiments, outlet brine stream 608 may be super saturated with dissolved salts. In some embodiments, the salt concentration of outlet brine stream 508 is 20-80 wt. %, 30-70 wt. %, or 40-60 wt. % that of product stream 610. In some embodiments, the salt concentration of outlet brine stream 508 is less than 80 wt. %, less than 70 wt. %, less than 60 wt. %, less than 50 wt. %, less than 40 wt. %, or less than 30 wt. % that of product stream 610. In some embodiments, the salt concentration of outlet brine stream is more than 20 wt. %, more than 30 wt. %, more than 40 wt. %, more than 50 wt. %, more than 60 wt. %, or more than 70 wt. % that of product stream 610.

As explained above, dilution of the organic solvent may occur over time due to osmosis and electro-osmosis. Dilution of the organic solvent can increase the solubility of salts in solution. In some embodiments, an increase in salt solubility in the organic solvent may be undesirable. Thus, to maintain a relatively lower solubility in the organic solvent composition, it may be necessary to recover the solvent using a thermal process, for example. As shown in FIG. 6, the solvent is recovered using a forced recirculation process. Flash condensate stream 612 is fed from the headspace of precipitation tank 650 to distillation column 670 of the forced recirculation process. Distillation column 670 generates vapor stream 672 that comprises a higher concentration of low boiling point organic solvent than does flash condensate stream 612. Vapor stream 672 may be condensed via condenser 676 to generate condensed solvent recovery stream 678, which may then be returned to electrodialysis device 600 to enrich the organic solvent brine stream and dilute the dissolved salt in the brine stream. In some embodiments, inlet brine stream 638 may comprised condensed solvent recovery stream 678.

The bottoms, or high boiling point solvent 680, produced by distillation column 670, may be further processed to recover water. This recovery process may be conducted using additional distillation methods known to those skilled in the art. The recovered water may also be used as fuel for thermal processes.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A water treatment system for separating dissolved salts from a feed stream comprising:
   an inlet feed stream comprising dissolved salts;
   an inlet brine stream comprising at least 60 wt. % ethanol and/or isopropanol;
   an electrodialysis unit configured to remove the dissolved salts from the inlet feed stream and add the dissolved salt to the inlet brine stream to form an outlet brine stream;
   a precipitation tank configured to precipitate the dissolved salts out of the outlet brine stream from the electrodialysis unit, wherein the precipitation tank comprises a flash valve configured to flash off a fraction of the solution of outlet brine stream as vapor;
   a supernatant brine stream from the precipitation tank comprising at least 60 wt. % ethanol and/or isopropanol, wherein the supernatant brine stream is sent to the electrodialysis unit to be at least a portion of the inlet brine stream;
   a distillation column configured to receive the vapor from the precipitation tank and generate a vapor stream comprising a higher concentration of ethanol and/or isopropanol than the vapor from the precipitation tank; and
   a condenser configured to condense the vapor stream from the distillation column, wherein the condensed vapor stream is sent to the electrodialysis unit to be at least a portion of the inlet brine stream.

2. The water treatment system of claim 1, wherein a salt concentration of a product stream of the electrodialysis unit is greater than a salt concentration of the outlet brine stream of the electrodialysis unit.

3. The water treatment system of claim 1, wherein the inlet brine stream and the outlet brine stream of the electrodialysis unit comprise a water and organic solvent composition.

4. The water treatment system of claim 3, wherein the water and organic solvent composition of the inlet brine stream comprises 2-20 wt. % water.

5. The water treatment system of claim 1, wherein the salt concentration of a product stream of the electrodialysis unit is less than that of the inlet feed stream.

6. The water treatment system of claim 1, wherein the salt concentration of a product stream of the electrodialysis unit is 50-80 wt. % that of the inlet feed stream.

7. The water treatment system of claim 1, wherein the salt concentration of the inlet brine stream is less than that of the outlet brine stream.

8. The water treatment system of claim 1, wherein the salt concentration of the inlet brine stream is 30-60 wt. % that of the outlet brine stream.

9. The water treatment system of claim 1, wherein the salt concentration of the outlet brine stream is less than that of a product stream of the electrodialysis unit.

10. The water treatment system of claim 1, wherein a salt concentration of the outlet brine stream is 30-70 wt. % that of a product stream of the electrodialysis unit.

11. The water treatment system of claim 1, wherein the supernatant brine stream of the precipitation tank comprises a supernatant.

12. The water treatment system of claim 1, comprising a screw conveyor configured to remove precipitated salts from the precipitation tank.

13. The water treatment system of claim 1, comprising a solvent recovery step configured to replenish organic solvent in the inlet brine stream.

14. The water treatment system of claim 1, wherein the inlet feed stream is controlled to a pH of 9 or less.

15. The water treatment system of claim 1, wherein the inlet feed stream is controlled to a pH of 7 or less.

16. The water treatment system of claim 1, wherein the dissolved salts comprise one or more of sodium chloride, lithium carbonate, boric acid, sodium sulfate, lithium hydroxide, sodium bicarbonate, or potassium chloride.

* * * * *